(12) United States Patent
Tanaka et al.

(10) Patent No.: US 7,420,015 B2
(45) Date of Patent: Sep. 2, 2008

(54) FLAME RETARDANT SILICONE COMPOSITIONS

(75) Inventors: Miyuki Tanaka, Usui-gun (JP); Kazuyasu Sato, Usui-gun (JP)

(73) Assignee: Shin-Etsu Chemical Co., Ltd., Tokyo (JP)

( * ) Notice: Subject to any disclaimer, the term of this patent is extended or adjusted under 35 U.S.C. 154(b) by 369 days.

(21) Appl. No.: 10/722,406

(22) Filed: Nov. 28, 2003

(65) Prior Publication Data

US 2004/0106706 A1    Jun. 3, 2004

(30) Foreign Application Priority Data

Nov. 29, 2002    (JP)    ............... 2002-347807

(51) Int. Cl.
    *C08L 83/05*    (2006.01)
(52) U.S. Cl. .................... 524/588; 528/32; 528/31
(58) Field of Classification Search ................. 524/588; 528/32, 31
    See application file for complete search history.

(56) References Cited

U.S. PATENT DOCUMENTS

| 3,867,343 A | | 2/1975 | Garden | |
|---|---|---|---|---|
| 4,511,715 A | * | 4/1985 | Palensky et al. | ............ 544/225 |
| 4,720,431 A | * | 1/1988 | Wong | ......................... 428/447 |
| 5,104,919 A | * | 4/1992 | Okami et al. | ................ 524/94 |
| 5,331,075 A | * | 7/1994 | Sumpter et al. | ............... 528/15 |
| 5,516,838 A | | 5/1996 | Fujiki et al. | |

FOREIGN PATENT DOCUMENTS

| EP | 0 732 373 | | 9/1996 |
|---|---|---|---|
| JP | 49-089696 A | | 12/1973 |
| JP | 57-176994 A | | 10/1982 |
| JP | 5-295269 A | | 11/1992 |
| JP | 05-279571 | * | 10/1993 |
| JP | 8-231858 | | 9/1996 |
| JP | 2864944 | | 3/1999 |

* cited by examiner

*Primary Examiner*—Kuo-Liang Peng
(74) *Attorney, Agent, or Firm*—Oblon, Spivak, McClelland, Maier & Neustadt, P.C.

(57) ABSTRACT

A silicone composition comprising (A) an organopolysiloxane having at least one lower alkenyl group in a molecule, (B) an organohydrogenpolysiloxane having at least two SiH groups in a molecule, (C) a platinum catalyst, and (D) at least one compound selected from among indoline, 1,2,3-triazole, 1,2,4-triazole, imidazole, indazole, benzoxazole, 2-hydroxybenzoxazole, 5-benzyloxyindole, 1,2-benzisoxazole, 2,1-benzisoxazole, and 1,3-benzodioxole cures effectively into a transparent rubbery or gel product having flame retardance.

17 Claims, No Drawings

FLAME RETARDANT SILICONE COMPOSITIONS

TECHNICAL FIELD

This invention relates to silicone compositions which cure into flame retardant products and are suitable for the protection of ICs and hybrid ICs.

BACKGROUND OF THE INVENTION

A number of techniques are known in the art for rendering flame retardant addition curing silicone rubber compositions which cure into elastomers. The most basic technique is the addition of platinum compounds to organopolysiloxanes. The addition of benzotriazole, hydrazine or the like is also known effective for improving flame retardance. Fumed titanium oxide, cerium oxide, cerium hydroxide, iron oxide and carbon powder are also ascertained to be effective. All the silicone rubber compositions to which these compounds are added are also filled with reinforcing inorganic fillers such as fumed silica and ground quartz.

Among transparent materials based on organopolysiloxane, it is known to use silicone gel as a filler in members associated with optical equipment, as a protective material for hybrid integrated circuits used in electric and electronic parts for automobiles, and as a protective sealant for commercial power modules. Flame retardance is required in these applications as well. Flame retardance is developed by the addition of amine compounds as disclosed in Japanese Patent No. 2,864,944 corresponding to U.S. Pat. No. 5,516,838 or by the addition of phosphorus compounds as disclosed in JP-A 8-231858.

For more efficient working on the user side and from the characteristics of IC chips to be protected, silicone compositions are recently required to be curable at lower temperatures than in the prior art and ven at room temperature, and be formulated as one package. However, compositions using amine compounds as disclosed in Japanese Patent No. 2,864,944 are very difficult to cure at low temperatures and even at room temperature while maintaining flame retardance.

SUMMARY OF THE INVENTION

An object of the present invention is to provide a flame retardant silicon composition which is effectively curable at room temperature, can be formulated as one package, and cures into a rubbery or gel product having transparency and flame retardance.

It has been found that a silicone composition is comprising (A) an organopolysiloxane having at least one lower alkenyl group in a molecule, (B) an organohydrogenpolysiloxane having at least two hydrogen atoms bonded to silicon atoms in a molecule, (C) a platinum catalyst, and (D) at least one compound selected from the group consisting of indoline, 1,2,3-triazole, 1,2,4-triazole, imidazole, indazole, benzoxazole, 2-hydroxybenzoxazole, 5-benzyloxyindole, 1,2-benzisoxazole, 2,1-benzisoxazole, and 1,3-benzodioxole is effectively curable at room temperature, can be formulated as one package, and cures into a rubbery or gel product having transparency and flame retardance. It has also been found that the cured product is further improved in flame retardance by controlling the content of low-molecular-welght cyclic siloxane fractions $D_3$ to $D_{10}$ (i.e., cyclic dimethylsiloxanes of 3 to 10 monomer units) in components (A) and (B).

Accordingly, the present invention provides a flame retardant silicone composition comprising (A) 100 parts by weight of an organopolysiloxane having at least one lower alkenyl group in a molecule, represented by the following general formula (1):

   (1)

wherein R is a 1 wer alkenyl group, $R^1$ is a substituted or unsubstituted monovalent hydrocarbon group free of aliphatic unsaturation, "a" is a positive number of 0.0001 to 0.2, "b" is a positive number of 1.7 to 2.2, and the sum of a+b is 1.9 to 2.4, (B) an organohydrogenpolysiloxane having at least two hydrogen atoms bonded to silicon atoms in a molecule, in an amount to give 0.1 to 5 silicon atom-bonded hydrogen atoms per alkenyl group in component (A), (C) a platinum catalyst in an amount to give 0.1 to 1,000 ppm of platinum element based on the weight of component (A), and (D) 0.0001 to 1 part by weight of at least one compound selected from the group consisting of indoline, 1,2,3-triazole, 1,2,4-triazole, imidazole, indazole, benzoxazole, 2-hydroxybenzoxazole, 5-benzyloxyindole, 1,2-benzisoxazole, 2,1-benzisoxazole, and 1,3-benzodioxole.

In a preferred embodiment, components (A) and (B) contain low-molecular-weight cyclic siloxane fractions $D_3$ to $D_{10}$ in a total amount of up to 1,000 ppm.

DESCRIPTION OF THE PREFERRED EMBODIMENTS

Component (A) is an organopolysiloxane having at least one lower alkenyl group in a molecule, serving as the base polymer in the inventive silicone composition. It is represented by the following general formula (1):

   (1)

wherein R is a lower alkenyl group, $R^1$ is a substituted or unsubstituted monovalent hydrocarbon group free of aliphatic unsaturation, "a" is a positive number of 0.0001 to 0.2, "b" is a positive number of 1.7 to 2.2, and the sum of a+b is 1.9 to 2.4.

More particularly, R is a lower alkenyl group of 2 to 6 carbon atoms, preferably 2 to 4 carbon atoms, such as vinyl, allyl, propenyl, isopropenyl, butenyl and isobutenyl, with vinyl being most desired. $R^1$ is selected from aliphatic unsaturation-free, substituted or unsubstituted, monovalent hydrocarbon groups having 1 to about 10 carbon atoms, preferably 1 to about 6 carbon atoms, for example, alkyl groups such as methyl, ethyl, propyl, isopropyl, butyl, isobutyl, tert-butyl, pentyl, hexyl, cyclohexyl, octyl, decyl and dodecyl, aryl groups such as phenyl and tolyl, aralkyl groups such as benzyl and phenylethyl, and substituted groups such as chloromethyl and 3,3,3-trifluoropropyl. For ease of synthesis and other reason, methyl or phenyl is desired.

The subscript "a" is a positive number of 0.0001 to 0.2, and "b" is a positive number of 1.7 to 2.2, and they are selected such that component (A) contains at least one, preferably 2 to 50 R groups (alkenyl groups). The sum of a+b is in the range from 1.9 to 2.4, preferably from 1.95 to 2.05. Although the organopolysiloxane (A) may be a straight-chain one or a branched one including $RSiO_{3/2}$ units, $R^1SiO_{3/2}$ units or $SiO_2$ units, preference is given to a straight-chain diorganopolysiloxane whose backbone consists essentially of recurring diorganosiloxane units and which is capped with triorganosiloxy groups at both ends of its molecular chain.

Preferably the organopolysiloxane (A) has a viscosity of 50 to 100,000 mPa·s at 25° C., more preferably 100 to 10,000 mPa·s at 25° C. With a viscosity of less than 50 mPa·s, the cured product may become brittle. An organopolysiloxane with a viscosity of more than 100,000 mPa·s may be less flowable and inefficient to work.

Component (B) is an organohydrogenpolysiloxane which reacts with component (A) and serves as a crosslinking agent. Its molecular structure is not critical, and any of straight, branched, cyclic and three-dimensional network structure (resinous) manufactured in the art may be used. The organohydrogenpolysiloxane should contain at least two, preferably at least three hydrogen atoms bonded to silicon atoms (i.e., hydrosilyl groups represented by SiH) in a molecule. It usually has about 3 to about 500, preferably about 3 to about 200, more preferably about 3 to about 100 SiH groups. The organohydrogenpolysiloxane used herein is typically of the following average compositional formula (2).

$$R^2_c H_d SiO_{(4-c-d)/2} \qquad (2)$$

In formula (2), $R^2$ is an aliphatic unsaturation-free, substituted or unsubstituted, monovalent hydrocarbon group bonded to a silicon atom, preferably having 1 to 10 carbon atoms. Examples of suitable monovalent hydrocarbon groups represented by $R^2$ include alkyl groups such as methyl, ethyl, propyl, isopropyl, butyl, isobutyl, tert-butyl, pentyl, neopentyl, hexyl, cyclohexyl, octyl, nonyl, and decyl; aryl groups such as phenyl, tolyl, xylyl and naphthyl; aralkyl groups such as benzyl, phenylethyl and phenylpropyl; and 3,3,3-trifluoropropyl. Of these, alkyl and aryl groups are preferred, with methyl and phenyl being more preferred for flame retardance. The subscript c is a positive number of 0.7 to 2.1, d is a positive number of 0.001 to 1.0, and the sum of c+d is 0.8 to 3.0. Preferably, c is 1.0 to 2.0, d is 0.01 to 1.0, and c+d is 1.5 to 2.5.

Two or more, preferably three or more SiH groups contained per molecule may be positioned at ends of or midway the molecular chain or both. The molecular structure of the organohydrogenpolysiloxane may be any of straight, branched, cyclic and three-dimensional network structure. For the physical properties of the resulting silicone rubber and ease of handling of the composition, it is recommended to use an organohydrogenpolysiloxane having a number of silicon atoms per molecule (or degree of polymerization) desirably in the range of about 2 to about 1,000. more desirably about 3 to about 300, even more desirably about 4 to about 150. The desired organohydrogenpolysiloxane used herein is liquid at room temperature (25° C.) as demonstrated by a viscosity at 25° C. of about 0.1 to about 5,000 mPa·s, more desirably about 0.5 to about 1,000 mPa·s, even more desirably about 5 to about 500 mPa·s.

Examples of the organohydrogenpolysiloxane of av rag compositional formula (2) include
1,1,3,3-tetramethyldisiloxane,
methylhydrogencyclopolysiloxane,
methylhydrogensiloxane-dimethylsiloxane cyclic copolymers,
both end trimethylsiloxy-capped methylhydrogenpolysiloxane,
both end trimethylsiloxy-capped dimethylsiloxane-methylhydrogensiloxane copolymers,
both end dimethylhydrogensiloxy-capped dimethylpolysiloxane,
both end dimethylhydrogensiloxy-capped dimethylsiloxane-methylhydrogensiloxane copolymers,
both end trimethylsiloxy-capped methylhydrogensiloxane-diphenylsiloxane copolymers,
both end trimethylsiloxy-capped methylhydrogensiloxane-diphenylsiloxane-dimethylsiloxane copolymers,
both end dimethylhydrogensiloxy-capped methylhydrogensiloxane-dimethylsiloxane-diphenylsiloxane copolymers,
copolymers consisting of $(CH_3)_2HSiO_{1/2}$ units, $(CH_3)_3SiO_{1/2}$ units and $SiO_{4/2}$ units, copolymers consisting of $(CH_3)_2HSiO_{1/2}$ units and $SiO_{4/2}$ units, and copolymers consisting of $(CH_3)_2HSiO_{1/2}$ units, $SiO_{4/2}$ units and $(C_6H_5)_3SiO_{1/2}$ units.

Component (B) is added in amounts to give 0.1 to 5, preferably 0.5 to 3 silicon atom-bonded hydrogen atoms (i.e., SiH groups) per alkenyl group in component (A) An amount to give less than 0.1 SiH group may result in too low a crosslinked density and adversely affect the heat resistance of cured products. An amount to give more than 5 SiH groups may raise a problem of foaming due to dehydrogenation reaction and adversely affect the heat resistance of cured products.

It has been found that the content of nonfunctional low-molecular-weight siloxane fractions, especially cyclic dimethylsiloxanes consisting of 3 to 10 monomer units ($D_3$ to $D_{10}$) in components (A) and (B) is a factor largely affecting flame retardance. In general, component (A) is prepared by effecting equilibration reaction of cyclopolysiloxane in the presence of a strongly basic catalyst such as potassium hydroxide, tetraalkylammonium hydroxide or tetraalkylphosphonium hydroxide or a siliconate thereof, then neutralizing the catalyst for deactivation, obtaining a polymer. Usually, low-molecular-weight siloxane by-products formed in the process are removed by stripping under heat and vacuum. Although the level of removal depends on economy, the currently commercially available products are generally refined such that the total amount of low-molecular-weight siloxanes in which the total number of silicon atoms per molecule is 3 to 10 is in a range of several thousands to several ten thousands of ppm. It has been found that a drastic improvement in flame retardance is attained by reducing the total content of nonfunctional low-molecular-weight siloxane fractions in the composition to 1,000 ppm or less, especially to 500 ppm or less.

It Is then recommended that the total content of nonfunctional low-molecular-weight siloxane fractions $D_3$ to $D_{10}$ (i.e., cyclic dimethylsiloxanes of 3 to 10 monomer units) in components (A) and (B) be equal to or less than 1,000 ppm, especially equal to or less than 500 ppm.

In reducing the amount of low-molecular-weight siloxane fractions, an evaporation method commonly used in the art is difficult, and use may be made of critical extraction, solvent extraction of low-molecular-weight fractions, or stripping through thin-layer evaporation. After the removal of low-molecular-weight siloxane fractions through treatment under heat and vacuum as by thin-layer evaporation, component (A) inevitably has a reduced content of residual silanols. The content of low-molecular-weight siloxane fractions is measured by FID gas chromatography.

Component (C) is a platinum catalyst which is platinum or a platinum compound, serving to promote the addition reaction between silicon atom-bonded alkenyl groups in component (A) and silicon atom-bonded hydrogen atoms (i.e., SiH groups) in component (B). Any of well-known catalysts may be used. Examples include platinum black, chloroplatinic acid, alcohol modified products of chloroplatinic acid, complexes of chloroplatinic acid with olefins, aldehydes, vinylsiloxanes and acetylene alcohols.

The amount of component (C) added is a catalytic amount and may be determined as appropriate in accordance with the desired curing rate. Usually, component (C) is added in such amounts as to give 0.1 to 1,000 ppm, preferably 10 to 300 ppm of platinum element based on the weight of component (A).

Blended for improving flame retardance according to the invention is a compound selected from the group consisting of indoline, 1,2,3-triazole, 1,2,4-triazole, imidazole, indazole, benzoxazole, 2-hydroxybenzoxazole, 5-benzyloxyindole, 1,2-benzisoxazole, 2,1-benzisoxazole, and 1,3-benzodioxole. Although the action of these compounds is not well understood, significant effects are ascertained upon evaluation by an actual burning test. The compounds may be used alone or in admixture of two or more.

An appropriate amount of component (D) blended is 0.0001 to 1 part by weight, preferably 0.001 to 0.5 part by weight per 100 parts by weight of component (A). Too less an amount of component (D) fails to improve flame retardance whereas too much an amount may inhibit the cure of the composition or rather adversely affect the flame retardance of cured products.

Component (D) may be added to the composition directly or after dissolving in a polar solvent such as a lower alcohol, if desired.

In the inventive composition, acetylene inhibitors, amine inhibitors and carboxylate inhibitors may be added for inhibiting reaction of the composition. Insofar as flame retardance is not impaired, the composition may be filled with fillers such as reinforcing fumed silica or wet process silica powder. Additives such as carbon black, red iron oxide, cerium oxide, cerium hydroxide, titanium oxide, titanate esters, alumina, benzotriazole, benzimidazole, phenoxazine, N-allylaniline, p-anilinophenol, m-anilinophenol, 2-phenylindole, and 2-anilinoethanol may also be incorporated insofar as the objects are not impaired.

The inventive composition may be prepared by mixing the above-described components in a conventional manner. If desired, the composition is divided into two or more parts. For example, the composition can be divided into two parts: one part comprising a portion of component (A) and component (C) and the other part comprising the remainder of component (A), component (B) and component (D).

The inventive composition will cure at room temperature or under appropriate temperature conditions for a particular application, yielding a silicone rubber or gel endowed with flame retardance.

The present invention is successful in imparting flame retardance to transparent silicone rubber and gel which have been difficult to impart flame retardance in the prior art. By imparting flame retardance to silicon gel which is often used as a protective material for integrated circuits, the reliability of such electronic parts is further improved.

EXAMPLE

Examples of the present invention are given below by way of illustration and not by way of limitation. All parts and percents are by weight.

Example 1

To 100 parts of a dimethylpolysiloxane capped with dimethylvinylsiloxy groups at both ends of its molecular chain and having a viscosity of 1,000 mPa·s at 25° C. (total content of cyclic dimethylsiloxanes of 3 to 10 monomer units ($D_3$-$D_{10}$), 2,500 ppm) were added 1.7 parts of a methylhydrogenpolysiloxane of the following formula (3):

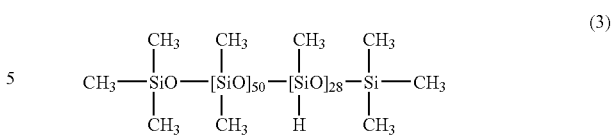

having a viscosity of 120 mPa·s at room temperatur (total content of cyclic dimethylsiloxanes of 3 to 10 monomer units ($D_3$-$D_{10}$), 2,800 ppm) (the ratio of the number of silicon atom-bonded hydrogen atoms to the number of vinyl groups, H/Vi, was 0.7), 0.25 part of a dimethylpolysiloxane solution of chloroplatinic acid/vinylsiloxane complex containing 1% of platinum element, and 0.005 part of benzoxazole. The ingredients were uniformly mixed, after which the composition was heat cured at 150° C. for 30 minutes into a transparent silicone gel sheet of 3 mm thick which had a penetration of 45.

Example 2

The procedure of Example 1 was repeated except that a dimethylpolysiloxane capped with dimethylvinylsiloxy groups at both ends of its molecular chain and having a viscosity of 1,000 mPa·s at 25° C. and a low-molecular-weight siloxane content (total content of cyclic dimethylsiloxanes of 3 to 10 monomer units. $D_3$-$D_{10}$) of 350 ppm was used instead of the dimethylpolysiloxane in Example 1, and a methylhydrogenpolysiloxane of the formula (3) having a low-molecular-weight siloxane content (total content of cyclic dimethylsiloxanes of 3 to 10 monomer units, $D_3$-$D_{10}$) of 330 ppm was used instead of the methylhydrogenpolysiloxane in Example 1. There was obtained a transparent silicone gel sheet of 3 mm thick which had a penetration of 43.

Example 3

The composition of Example 1 was heated at 60° C. for 2 hours, yielding a transparent silicone gel sheet of 3 mm thick which had a penetration of 50.

Example 4

To 100 parts of a dimethylpolysiloxane capped on average with a dimethylvinylsilyl group at one end of its molecular chain and having a viscosity of 800 mPa·s at 25° C. were added 0.9 part of the methylhydrogenpolysiloxane in Example 1 (H/Vi was 1.2), 0.25 part of a dimethylpolysiloxane solution of chloroplatinic acid/vinylsiloxane complex containing 1% of platinum element, and 0.010 part of 1,2-benzisoxazole. The ingredients were uniformly mixed, after which the composition was held at 25° C. for one day into a transparent silicone gel sheet of 3 mm thick which had a penetration of 53.

Example 5

To 100 parts of a dimethylpolysiloxane end-capped with a dimethylvinylsilyl group and having a viscosity of 1,000 mPa·s at 25° C. were added 5.5 parts of a methylhydrogenpolysiloxane of the following formula (4):

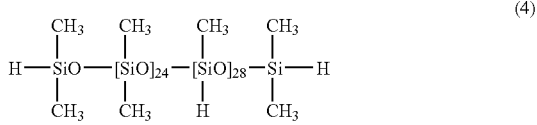

(4)

having a viscosity of 30 mPa·s at 25° C. (H/Vi was 1.5), 0.25 part of a dimethylpolysiloxane solution of chloroplatinic acid/vinylsiloxane complex containing 1% of platinum element, 0.010 part of 1,2-benzisoxazole, and 0.005 part of indazole. The ingredients were uniformly mixed, after which the composition was heated at 150° C. for 30 minutes, yielding a transparent silicone rubber sheet of 3 mm thick which had an Asker C hardness of 10.

Comparative Example 1

The procedure of Example 1 was repeated except that benzoxazole was omitted. There was obtained a transparent silicone gel sheet of 3 mm thick which had a penetration of 38.

Comparative Example 2

The procedure of Example 2 was repeated except that benzoxazole was omitted. There was obtained a transparent silicone gel sheet of 3 mm thick which had a penetration of 37.

Comparative Example 3

In Example 1, a uniform mixture was prepared using 0.01 part of benzimidazole instead of 0.005 part of benzoxazole. The composition was held at room temperature (25° C.) for one day, but did not cure.

Comparative Example 4

In Example 1, a uniform mixture was prepared using 0.003 part of benzotriazole instead of benzoxazole. The composition was heated at 60° C. for 4 hours, obtaining a transparent silicone gel sheet of 3 mm thick which had a penetration of 85.

On these nine silicone compositions, a flame retardant test was carried out. In the test, the sheet of 3 mm thick obtained above was cut into bars of 125 mm×13 mm. The test bars were subjected to burning in accordance with the vertical burning test set forth in Underwriters Laboratories, Inc. Bulletin 94 (UL-94), V-0, V-1 or V-2. The flaming time was measured two times, and the result is an average of 5 specimens. The results are shown in Table 1.

TABLE 1

| Flaming time (sec) | Example | | | | | Comparative Example | | | |
|---|---|---|---|---|---|---|---|---|---|
| | 1 | 2 | 3 | 4 | 5 | 1 | 2 | 3 | 4 |
| 1st | 12 | 8 | 14 | 11 | 5 | burned down | burned down | — | 120 |
| 2nd | 2 | 1 | 2 | 2 | 1 | — | — | — | 83 |

The flame retardant silicone compositions of the invention have a good curing ability and cure into rubbery or gel products having transparency and improved flame retardance. The compositions are thus suited for the protection of ICs, hybrid ICs and the like.

Japanese Patent Application No. 2002-347807 is incorporated herein by reference.

Although some preferred embodiments have been described, many modifications and variations may be made thereto in light of the above teachings. It is therefore to be understood that the invention may be practiced otherwise than as specifically described without departing from the scope of the appended claims.

The invention claimed is:

1. A flame retardant silicone composition comprising
   (A) 100 parts by weight of an organopolysiloxane having at least one alkenyl group having 2 to 6 carbon atoms, in a molecule of the organopolysiloxane, represented by the following general formula (1):

$$R_a R^1_b SiO_{(4-a-b)/2} \quad (1)$$

wherein R is an alkenyl group having 2 to 6 carbon atoms, $R^1$ is a substituted or unsubstituted monovalent hydrocarbon group free of aliphatic unsaturation, "a" is a positive number of 0.0001 to 0.2, "b" is a positive number of 1.7 to 2.2, and the sum of a+b is 1.9 to 2.4,
   (B) an organohydrogenpolysiloxane having at least two hydrogen atoms bonded to silicon atoms in a molecule, in an amount to give 0.1 to 5 silicon atom-bonded hydrogen atoms per alkenyl group in component (A),
   (C) a platinum catalyst in an amount to give 0.1 to 1,000 ppm of platinum element based on the weight of component (A), and
   (D) 0.0001 to 1 part by weight of at least one compound selected from the group consisting of indoline, benzoxazole, 2-hydroxybenzoxazole, 5-benzyloxyindole, 1,2-benzisoxazole, 2,1-benzisoxazole, and 1,3-benzodioxole.

2. The composition of claim 1 wherein components (A) and (B) contain low-molecular-weight cyclic siloxane fractions $D_3$ to $D_{10}$ in a total amount of up to 1,000 ppm.

3. The composition of claim 1, comprising indoline.

4. The composition of claim 1, comprising benzoxazole.

5. The composition of claim 1, comprising 2-hydroxybenzoxazole.

6. The composition of claim 1, comprising 5-benzyloxyindole.

7. The composition of claim 1, comprising 1,2-benzisoxazole.

8. The composition of claim 1, comprising 2,1-benzisoxazole.

9. The composition of claim 1, comprising 1,3-benzodioxole.

10. The composition of claim 1, wherein the organopolysiloxane having the at least one alkenyl group in a molecule is capped at both ends of its molecular chain with triorganosiloxy groups.

11. The composition of claim 10, wherein the organopolysiloxane is a straight-chain organopolysiloxane.

12. The composition of claim 1, wherein the organopolysiloxane is a branched organopolysiloxane.

13. The composition of claim 1, comprising:
    dimethylpolysiloxane capped with dimethylvinylsiloxy groups at both ends of its molecular chain;
    a methylhydrogenpolysiloxane of the following formula (3)

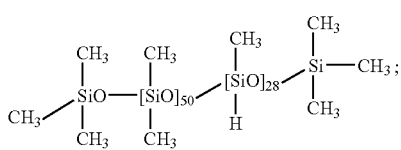

(3)

a chloroplatinic acid/vinyl siloxane complex; and benzoxazole.

14. A cured transparent and flame retardant composition obtained by curing the composition of claim 1.

15. An integrated circuit covered with a flame retardant composition obtained by curing the composition of claim 1.

16. The integrated circuit of claim 15, wherein the cured composition is in the form of a transparent gel or transparent rubbery product.

17. A flame retardant silicone composition comprising
   (A) 100 parts by weight of an organopolysiloxane having at least one alkenyl group having 2 to 6 carbon atoms, in a molecule of the organopolysiloxane, represented by the following general formula (1):

$$R_a R^1_b SiO_{(4-a-b)/2} \tag{1}$$

wherein R is an alkenyl group having 2 to 6 carbon atoms, $R^1$ is a substituted or unsubstituted monovalent hydrocarbon group free of aliphatic unsaturation, "a" is a positive number of 0.0001 to 0.2, "b" is a positive number of 1.7 to 2.2, and the sum of a+b is 1.9 to 2.4,
   (B) an organohydrogenpolysiloxane having at least two hydrogen atoms bonded to silicon atoms in a molecule, in an amount to give 0.1 to 5 silicon atom-bonded hydrogen atoms per alkenyl group in component (A),
   (C) a platinum catalyst in an amount to give 0.1 to 1,000 ppm of platinum element based on the weight of component (A), and
   (D) 0.0001 to 1 part by weight of at least one compound other than said platinum catalyst (C) selected from the group consisting of indoline, indazole, benzoxazole, 2-hydroxybenzoxazole, 5-benzyloxyindole, 1,2-benzisoxazole, 2,1-benzisoxazole, and 1,3-benzodioxole,
wherein components (A) and (B) contain low-molecular-weight cyclic siloxane fractions $D_3$ to $D_{10}$ in a total amount of up to 1,000 ppm.

* * * * *